C. W. ABBOTT.
METAL CONDUIT FOR ELECTRIC WIRES.
APPLICATION FILED AUG. 18, 1915.

1,252,314.

Patented Jan. 1, 1918.

Witness:
Harry S. Gaither
H. A. Neiburger

Inventor:
Chauncey W. Abbott
by Williams & Bradbury
Attys.

UNITED STATES PATENT OFFICE.

CHAUNCEY W. ABBOTT, OF PITTSBURGH, PENNSYLVANIA, ASSIGNOR TO AMERICAN CONDUIT MANUFACTURING COMPANY, OF PITTSBURGH, PENNSYLVANIA, A CORPORATION OF PENNSYLVANIA.

METAL CONDUIT FOR ELECTRIC WIRES.

1,252,314.       Specification of Letters Patent.       Patented Jan. 1, 1918.

Application filed August 18, 1915. Serial No. 46,065.

*To all whom it may concern:*

Be it known that I, CHAUNCEY W. ABBOTT, a citizen of the United States, residing at Pittsburgh, in the county of Allegheny and State of Pennsylvania, have invented a certain new and useful Improvement in Metal Conduits for Electric Wires, of which the following is a full, clear, concise, and exact description, reference being had to the accompanying drawings, forming a part of this specification.

My invention relates to metal conduits for electric wires and particularly to conduits for application to a wall, ceiling or other exposed supporting surface, such as are used for installing electric wiring systems after erection of the building, or for extending existing systems or for other purposes.

The object of the invention is to provide a conduit of this kind which is of simple and inexpensive construction, which has a neat and graceful appearance when applied to a wall, which can be easily and readily assembled, one which can readily be applied to its associated supporting surface and one which provides a smooth, uninterrupted and unblocked wire channel, and which also provides perfect electrical continuity of the conduit so that it may be used as the return or ground conductor of the electrical system. In attaining the objects of my invention I have produced a conduit which when attached to a flat, supporting surface seals the space between the supporting surface and the conduit itself by means of a pair of sharp, almost knife-like edges which press against and slightly into the supporting surface and prevent the collection of either dust or moisture in the space between the conduit and the supporting wall or ceiling.

The principal object of metal conduits is to confine break-downs of the electric system to quarters in which they cannot communicate fire to the building in which the breakdowns occur. Even with great precaution the conduit occasionally becomes heated through some wiring break-down within, which is responsible for the precaution against dust, as provided in my improved conduit.

The hereinafter described embodiment of my invention provides a continuous unbroken interior passage and a similar external visible surface, the supporting means being hidden from view and at the same time being removed from the passage through the conduit.

In the accompanying drawings illustrating my invention

Similar reference characters refer to similar parts throughout the several views.

Figure 1:
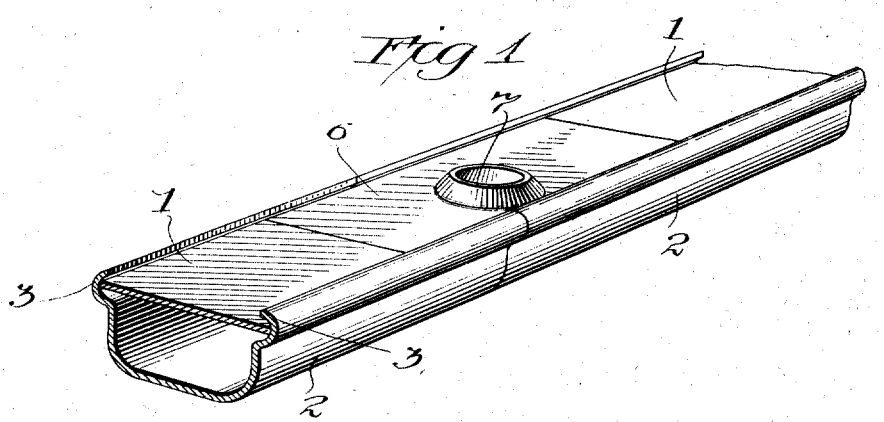
Figure 1 is a perspective view, showing the adjacent ends of two conduit sections and the means for coupling the said sections together.
Figure 2:
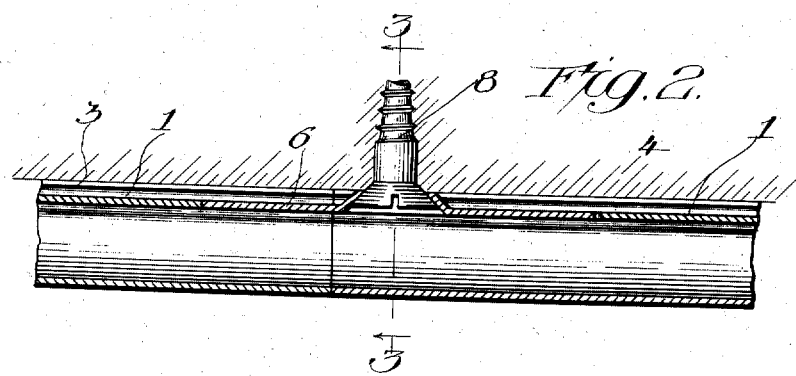
Fig. 2 is a longitudinal sectional view.
Figure 3:
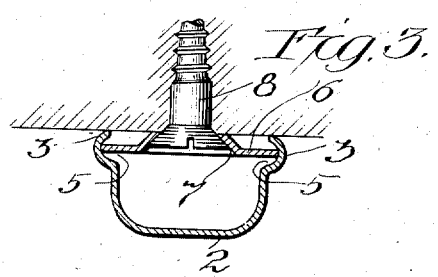
Fig. 3 is a cross-sectional view taken on the line 3—3 of Fig. 2 and looking in the direction indicated by the arrows.

Each of the conduit sections comprises two principal elements; that is, a base 1, and a cap or cover 2. The bases 1 are desirably flat metal strips which are preferably imperforate. Each of the base strips 1 is made of any suitable metal, such, for instance, as galvanized steel, and is of uniform width from end to end with well defined edges so as to produce good electrical contact with its associated cover member. Each of the cover members 2 is also made of suitable metal, such as thin sheet steel of such weight and thickness as to be fairly rigid and strong, thus avoiding the accidental production of bends or twists in handling the material which might produce a permanent distortion or set thereof. In cross section the cap or cover is, in general, of U-shape, each edge of the material being bent or pressed to form inwardly extending projections 3 which lie between the base and the wall or other supporting surface, shown at 4, when the conduit is attached thereto. The projections 3 in the present embodiment of my invention are preferably in the form of continuous flanges, as shown. As is clearly illustrated in Figs. 1 and 3 of the drawings, the projections 3 on the two sides of the cover form the edges of inwardly facing channels 5 which are substantially semi-cylindrical in cross-section. The base members 1 and their associated cap or cover members 2 are assembled, as is illustrated in the drawings, it being understood that the covers 2 are of such size that the distance between the side walls of each one of the covers between the bottoms of its grooves 5 is slightly less than the width of the associated base member in order that when the parts are assembled as shown in Fig. 1, the base member will be rigidly clamped between the arms of its associated U-shaped cover or cap member. Each of the base members 1 is by friction held between the U-shaped arms of its associated cover or cap member 2, the sharp edges of the base producing good electrical contact between the cap and base.

For securing adjacent or successive conduit sections to each other a special coupling or bond is employed which in the herein-described embodiment of my invention lies in the plane of the base members of the connected conduit sections. When two conduit sections are to be connected, the adjacent ends of the base members of the sections to be connected are cut so that they fall short of coming to the ends of their associated cover members 2. A coupling member 6 is then inserted into the channels 5—5 of each of the cover members 2 and the adjacent ends of the cover members are brought into engagement, as is illustrated in Fig. 1. It will be seen that the coupling member 6 may be and desirably is of substantially the same material as the base members 1. The coupling member lies in the same plane as its associated base members and in fact with the base members constitutes a substantially continuous base member for the cover or cap sections 2.

The coupling member 6 is desirably conformed as illustrated at 7 so that a fillet-head screw 8 may be inserted therethrough into the wall or other support 4 to secure the connected conduit sections in position.

The coupling is entirely concealed by the associated cap or cover members 2—2 which rest solidly against the supporting surface so that there are no unsightly projections and the entire conduit has a neat and graceful appearance.

What I claim as new and desire to secure by Letters Patent of the United States is:

1. In an electrical conduit the combination of a substantially flat base member, a cover member of general U or channel shape having inwardly extending projections to receive the lateral edges of the base and a coupling for adjacent conduit sections provided with means for securing it to a support and lying within the projections of said cover member and in the same plane as the base member.

2. In an electrical conduit the combination of a substantially flat base, a cover member of substantially U-shape having means formed on its edges arranged to receive the edges of the base and a coupling for securing adjacent conduit sections together provided with means for securing it to a support lying in the same plane as the base.

3. In an electrical conduit the combination of a pair of base members, a cover member for each base member provided with inwardly extending projections to receive the edges of its associated base member and having one end thereof extending beyond the end of its associated base member, the ends of said cover members abutting each other, and a coupling member disposed between the projections of said cover members and lying in the same plane as the base members with which said cover members are associated, said coupling member being provided with means for securing it to a support.

4. An electrical conduit comprising a plurality of sections, each section consisting of a substantially flat base member and a cover member of general channel or U shape, each cover member provided at its edges with seats to receive the lateral edges of its associated base member, the cover members of contiguous conduit sections being disposed end to end, the base member of each section terminating short of the point at which the cover members abut, and a separate coupling member for each pair of contiguous sections disposed in the plane of the base members and lying in the seats of the cover members, said coupling member being provided with means for fastening it to a support.

In witness whereof, I have hereunto subscribed my name this 13th day of August, A. D. 1915.

CHAUNCEY W. ABBOTT.

Witnesses:
W. H. STONE,
G. M. STEUART.